(12) United States Patent
Dong et al.

(10) Patent No.: US 11,594,877 B2
(45) Date of Patent: Feb. 28, 2023

(54) OVER-CURRENT PROTECTION DEVICE

(71) Applicant: Polytronics Technology Corp., Hsinchu (TW)

(72) Inventors: Zhen Yu Dong, Tainan (TW); Yung Hsien Chang, Douliu (TW); Hsiu Che Yen, Taoyuan (TW); Yao Te Chang, Yunlin County (TW); Fu Hua Chu, Taipei (TW); Takashi Hasunuma, Narita (JP)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 17/411,966

(22) Filed: Aug. 25, 2021

(65) Prior Publication Data

US 2022/0399716 A1    Dec. 15, 2022

(30) Foreign Application Priority Data

Jun. 10, 2021   (TW) ................................ 110121095

(51) Int. Cl.
*H02H 9/02*     (2006.01)
*H01C 7/02*     (2006.01)
*H01C 1/14*     (2006.01)

(52) U.S. Cl.
CPC ........... *H02H 9/026* (2013.01); *H01C 1/1406* (2013.01); *H01C 7/021* (2013.01); *H01C 7/028* (2013.01)

(58) Field of Classification Search
CPC ...... H02H 9/026; H01C 1/1406; H01C 7/021; H01C 7/028
USPC ............................................................ 361/106
See application file for complete search history.

(56) References Cited

U.S. PATENT DOCUMENTS

| | | | |
|---|---|---|---|
| 2016/0035468 A1* | 2/2016 | Lo ..................... | H01C 17/06586 338/22 R |
| 2016/0233667 A1* | 8/2016 | Chen ...................... | H02H 9/026 |
| 2019/0140328 A1* | 5/2019 | Li ......................... | H01M 4/625 |
| 2022/0013259 A1* | 1/2022 | Chen ......................... | C08J 5/18 |

\* cited by examiner

*Primary Examiner* — Kevin J Comber
(74) *Attorney, Agent, or Firm* — Muncy, Geissler, Olds & Lowe, P.C.

(57) ABSTRACT

An over-current protection device comprises first and second electrode layers and a PTC material layer laminated therebetween. The PTC material layer comprises a polymer matrix and carbon black. The polymer matrix comprises a fluoropolymer having a melting point higher than 150° C. The carbon black is dispersed in the polymer matrix. A resistance jump $R_{jump\_1000@16V/50A}$ of the over-current protection device at 16V/50 A by 1000 cycles is 0.80-1.20. A resistance jump $R_{jump\_1000@25V/50A}$ of the over-current protection device at 25V/50 A by 1000 cycles is 0.90-1.30.

9 Claims, 3 Drawing Sheets

OVER-CURRENT PROTECTION DEVICE

BACKGROUND OF THE INVENTION

(1) Field of the Invention

The present application relates to an over-current protection device, and more particularly, to a small-sized over-current protection device having features of excellent voltage endurance, high endurable current per unit area of the device, and superior resistance jump.

(2) Description of the Related Art

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperatures, so that the circuit or cell can operate normally. However, when an over-current or an over-temperature event occurs in the circuit or cell, the resistance will instantaneously increase to a high resistance state (e.g. at least above $10^4 \Omega$), which is the so-called trip. Therefore, the over-current will be eliminated so as to protect the cell or the circuit device.

The over-current protection device includes a PTC device and two external electrodes or leads bonded to two opposite sides of the PTC device. The PTC device is composed of two metal foils and a PTC material layer laminated therebetween. The PTC material layer comprises a polymer matrix and a conductive filler evenly dispersed in the polymer matrix. For high-temperature environment applications, the PTC material layer of the over-current protection device usually uses fluoropolymer as the polymer matrix. Because electronic apparatuses are being made smaller than before as time goes on, it is required to extremely restrict the sizes or thicknesses of active and passive devices. However, for a traditional over-current protection device, if its size is reduced, its voltage endurance will be decreased at the same time, and thus the device cannot withstand large currents and high power. As a consequence, a small-sized over-current protection device is easily blown out in real applications. In addition, the resistance recovery of a small-sized over-current protection device is generally inferior. That is, the resistance jump of the device has a value that is too large or too small, and cannot be controlled to be falling within an appropriate numerical range.

SUMMARY OF THE INVENTION

To solve the above-mentioned problems, the present invention provides an over-current protection device. By introducing carbon black (C.B.) and a fluoropolymer with appropriate volume percentage in the PTC material layer, the over-current protection device can be miniaturized further. The over-current protection device also exhibits excellent voltage endurance and superior resistance jump. In the meanwhile, the device has high endurable power per unit area of the device and low power dissipation. The over-current protection device of the present invention is particularly suitable in applications for size-reduced electronic products, and is quite suitable for high temperature over-current protection applications.

In accordance with an aspect of the present application, the present application provides an over-current protection device comprising a first electrode layer, a second electrode layer, and a PTC material layer laminated therebetween. The PTC material layer comprises a polymer matrix and carbon black. The polymer matrix comprises a fluoropolymer having a melting point higher than 150° C., and comprises 55-65% by volume of the PTC material layer. The carbon black is dispersed in the polymer matrix, and comprises 30-34% by volume of the PTC material layer. A resistance jump $R_{jump\_1000@16V/50A}$ of the over-current protection device at 16V/50 A by 1000 cycles is 0.80-1.20. A resistance jump $R_{jump\_1000@25V/50A}$ of the over-current protection device at 25V/50 A by 1000 cycles is 0.90-1.30.

In an embodiment, the fluoropolymer comprises at least one of poly(vinylidene fluoride), polytetrafluoroethene, polyvinylidene fluoride, ethylene-tetra-fluoro-ethylene copolymer, tetrafluoroethylene-hexafluoro-propylene copolymer, ethylene-tetrafluoroethylene copolymer, perfluoroalkoxy modified tetrafluoroethylenes, poly(chlorotri-fluoro-tetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer.

In an embodiment, the PTC material layer further comprises a flame retardant being selected from the group consisting of halogen or phosphorous containing retardant, metal hydroxide, metal oxide, nitride, or any mixtures thereof, and comprising 2-10% by volume of the PTC material layer.

In an embodiment, the PTC material layer has a thickness of 0.12-0.20 mm.

In an embodiment, the PTC material layer has a top-view area of 50-75 mm².

In an embodiment, the over-current protection device passes a cycle life test at 16V/50 A and 25V/50 A by 1000 cycles without blowout.

In an embodiment, an endurable current per unit area of the over-current protection device is 0.070-0.100 A/mm².

In an embodiment, an endurable power per unit area of the over-current protection device is 1.70-2.5 W/mm².

In an embodiment, wherein the over-current protection device has a power dissipation of 1.70-2.30 W when 16V/50 A is applied to the over-current protection device at 25° C.

The over-current protection device of the present invention is so small-sized that it is particularly suitable in applications for size-reduced electronic products. By using specific volume percentage of carbon black and fluoropolymer, the over-current protection device also exhibits the features of high endurable power per unit area and low power dissipation. In addition, the device has excellent voltage endurance and superior resistance jump. The over-current protection device of the present invention is quite suitable for high temperature over-current protection applications.

BRIEF DESCRIPTION OF THE DRAWINGS

The present application will be described according to the appended drawings in which.

DETAILED DESCRIPTION OF THE INVENTION

Figure 1:
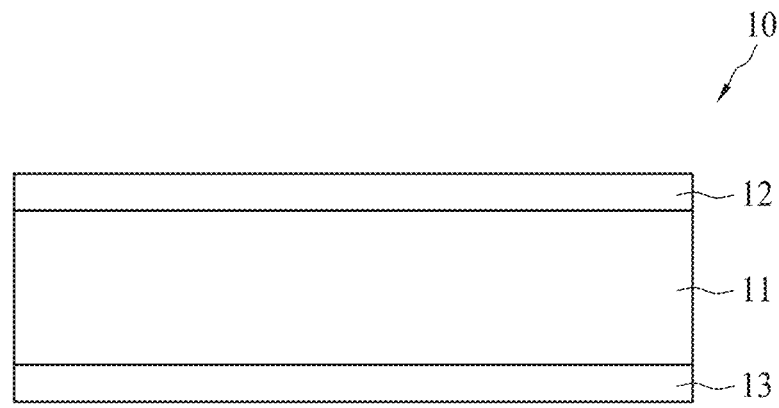
FIG. 1 shows a cross-sectional view of a PTC device in accordance with an embodiment of the present invention.

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Table 1 shows the composition to form a PTC material layer by volume percentages and the thickness of the PTC material layer in Embodiments (E1-E8) of the present application and Comparative Examples (C1-C2). To conduct a test, the fluoropolymer in the polymer matrix comprises polyvinylidene fluoride (PVDF) and polytetrafluoroethene (PTFE). PVDF uses Kynar® 761 A having a melting point temperature of 165° C., and PTFE uses Zonyl™ PTFE MPP1000 having a melting point temperature of 315° C. The fluoropolymer in E1-E4, as said above, includes PVDF and PTFE which together comprise 63-65% by volume of the PTC material layer. The fluoropolymer in C1-C4 comprises 62% by volume of the PTC material layer. The conductive filler in both E1-E4 and C1-C4 uses carbon black (C.B.) having a very stable electrical property. In E1-E4, C.B. comprises 32-34% by volume of the PTC material layer. In C1-C4, C.B. comprises 35% by volume of the PTC material layer. In addition, the PTC material layer further includes magnesium hydroxide ($Mg(OH)_2$), which comprises 3% by volume of the PTC material layer. Magnesium hydroxide ($Mg(OH)_2$) is used as a flame retardant, and can avoid generation of hydrofluoric acid that may affect electrical characteristics of the device when the conductive filler is mixed with fluoropolymer at high temperature.

It is understood that manufacturing a miniaturized over-current protection device having a smaller size than before is future development trend in this art. For this reason, the thickness of the PTC material layer in E1-E4 is reduced to 0.14-0.20 mm. In addition, the top-view area of the PTC material layer in E1-E4 is reduced as well in which the PTC material layer has a width of 7.62 mm and a length of 9.35 mm, and thus the PTC material layer or the PTC device (i.e., PTC chip) has a top-view area of 7.62×9.35=71.2 $mm^2$. To be compared with E1-E4, the PTC material layer in C1-C2 also has a width of 7.62 mm and a length of 9.35 mm, and thus its top-view area is 7.62×9.35=71.2 $mm^2$ also. However, in comparison with the PTC material layer in E1-E4, the PTC material layers in C1 and C2 have a thicker thickness, which are 0.26 mm and 0.36 mm, respectively. Both C3 and C4 use a traditional design of PTC material layer having a larger size of a width of 8 mm and a length of 12 mm, and thus the PTC material layers thereof have a top-view area of 8.0×12.0=96.0 $mm^2$, and have a thickness of 0.26 mm and 0.36 mm, respectively.

TABLE 1

|    | PVDF (vol %) | PTFE (vol %) | $Mg(OH)_2$ (vol %) | C.B. (vol %) | Thickness of PTC material layer (mm) |
|----|----|----|----|----|----|
| E1 | 58 | 5 | 3 | 34 | 0.18 |
| E2 | 58 | 5 | 3 | 34 | 0.14 |
| E3 | 60 | 5 | 3 | 32 | 0.20 |
| E4 | 60 | 5 | 3 | 32 | 0.14 |
| C1 | 57 | 5 | 3 | 35 | 0.26 |
| C2 | 57 | 5 | 3 | 35 | 0.36 |
| C3 | 57 | 5 | 3 | 35 | 0.26 |
| C4 | 57 | 5 | 3 | 35 | 0.36 |

Figure 2:
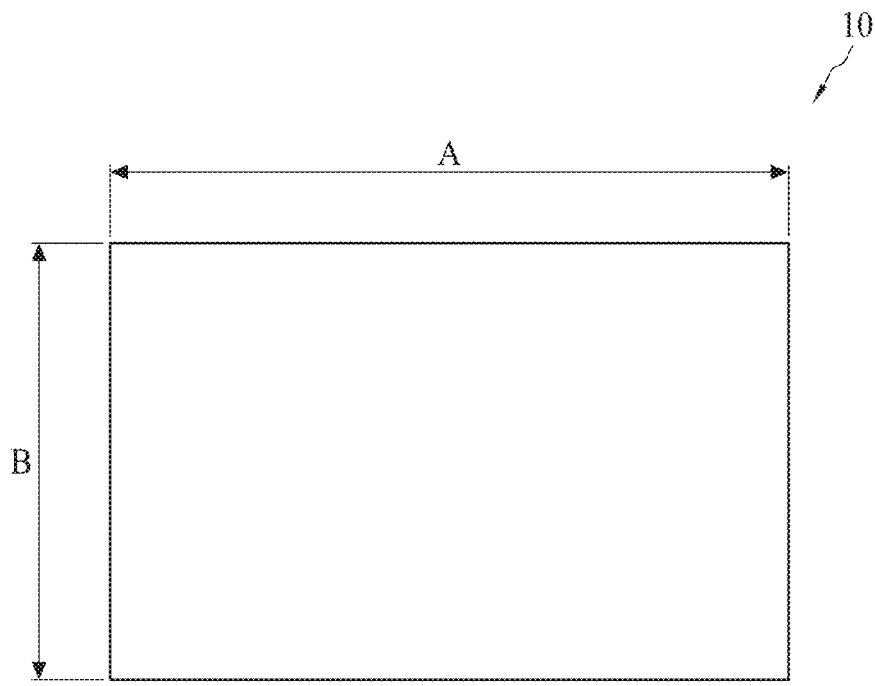
FIG. 2 shows a top view of the PTC device shown in FIG. 1.

The materials of E1-E4 and C1-C4 are put into HAAKE twin screw blender with the volume percentages as shown above for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/$cm^2$. The sheet is then cut into pieces of about 20 cm×20 cm, and two nickel-plated copper foils are laminated to two sides of the sheet with the hot press machine at a temperature of 210° C. and a pressure of 150 kg/$cm^2$. Then, the sheet with the nickel-plated copper foils is punched into PTC chips, i.e. PTC devices. FIG. 1 shows a cross-sectional view of a PTC device 10 of the present invention. FIG. 2 is a top view of the PTC device 10 shown in FIG. 1. The PTC device 10 comprises a PTC material layer 11 formed by the conductive polymer, and a first electrode layer 12 and a second electrode layer 13 formed by the nickel-plated copper foils. The top-view area "A×B" of the PTC device 10 is equivalent to the top-view area of the PTC material layer 11. The PTC devices formed from materials of E1-E4 and C1-C4 have a length and a width described above, therefore all these PTC devices, as formed, are in shape of a cuboid.

Figure 3:
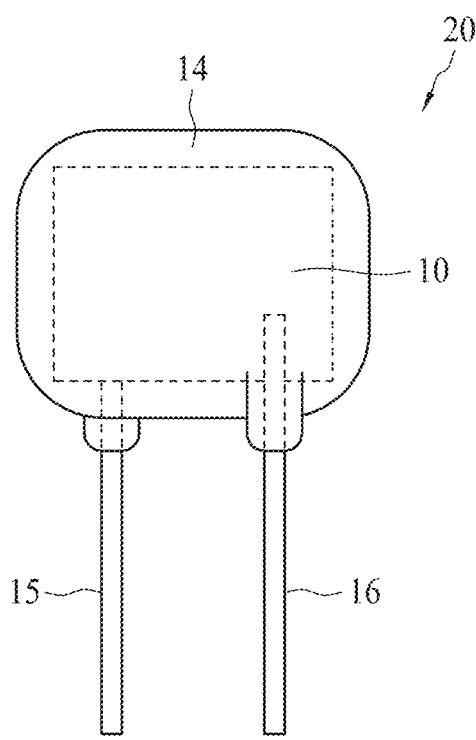
FIG. 3 shows a radial-leaded over-current protection device in accordance with an embodiment of the present invention.
Figure 4:
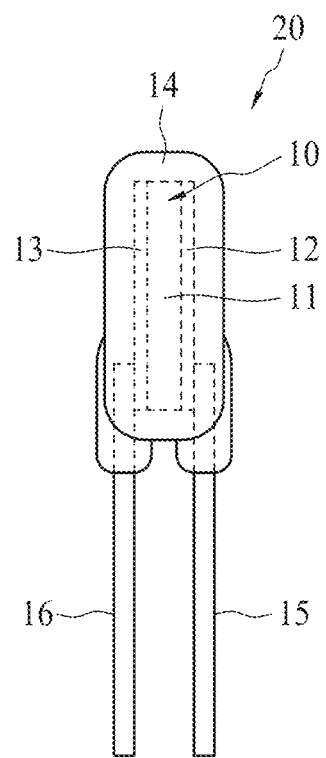
FIG. 4 shows a side view of the radial-leaded over-current protection device in FIG. 3.
Figure 5:
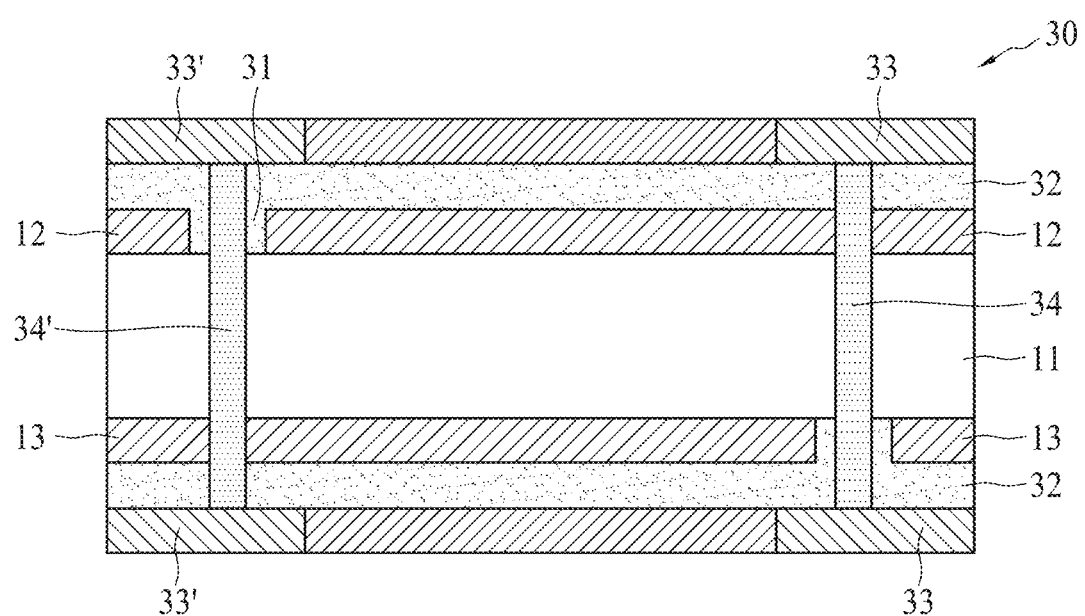
FIG. 5 shows a cross-sectional view of a surface-mountable over-current protection device in accordance with an embodiment of the present invention.

Next, please see FIGS. 3 and 4. A solder paste is coated on the outer surfaces of the first and second electrode layers 12 and 13, and two copper electrodes with a thickness of 0.5 mm are respectively disposed on the solder paste on the first and second electrode layers 12 and 13 as external leads 15 and 16, and then the assembled device is subjected to a reflow soldering process at 300° C. so as to form an over-current protection device 20 of a radial-leaded type. An insulation cover layer 14, such as an epoxy layer serving as an encapsulation layer, may be further formed on an entire outer surface of the device to avoid water and oxygen entering the device 20, wherein water and oxygen inside the device 20 may deteriorate electrical properties of the device 20. In addition to the radial-leaded type over-current protection device 20, the PTC device in an embodiment may subject to other steps to finally form an axial-type over-current protection device 20. Alternatively, as shown in FIG. 5, notches 31 may be made on the first and second electrode layers 12 and 13 by etching and followed by forming insulating layers 32, outer electrode layers 33 and 33', and vertical conductive holes 34 and 34', so as to form an over-current protection device 30 of surface-mountable device (SMD) type, wherein the vertical conductive holes 34 connects the first electrode layer 12 to the outer electrode layer 33, and the vertical conductive holes 34' connects the second electrode layer 13 to the outer electrode layer 33'. In short, the over-current protection device 20 and 30 of the present invention includes a PTC device 10 in which there are external leads 15 and 16 or outer electrode layers 33 and 33' being electrically bonded to outer surface of the PTC device. The external leads 15 and 16 or outer electrode layers 33 and 33' are connected to the first and second electrode layers 12 and 13, respectively, and are connected to outer circuits. Therefore, the device 20 and 30 of the present invention function to execute the over-current protection.

The following resistances of the over-current protection device 20 having different compositions, as listed above in Table 1, are measured: (1) initial resistance, Ri; (2) resistance at 16V and 50 A by 1000 cycles (on: 10 seconds; off: 60 seconds), R1000@16V/50 A; and (3) resistance at 25V and 50 A by 1000 cycles (on: 10 seconds; off: 60 seconds), R1000@25V/50 A. Each cycle comprises a process of trip and recovery. These values are recorded in Table 2. Moreover, a ratio of (R1000@16V/50 A)/(Ri) is calculated, and this ratio is defined as a resistance jump at 16V and 50 A by 1000 cycles, $R_{jump\_1000@16V/50A}$. That is, $R_{jump\_1000@16V/50A}$=(R1000@16V/50 A)/(Ri), which is used to evaluate resistance variation of device at 16V and 50 A by 1000 cycles. Furthermore, a ratio of (R1000@25V/50 A)/(Ri) is calculated, and this ratio is defined as a resistance jump at 25V and 50 A by 1000 cycles, $R_{jump\_1000@25V/50A}$. That is, $R_{jump\_1000@25V/50A}$=(R1000@25V/50 A)/(Ri), which is used to evaluate resistance variation of device at 25V and 50 A by 1000 cycles. Ideally, if the resistance jump has a numerical value equal to "1", it means that, in comparison with initial resistance Ri, there is no change in resistance after 1000 cycles are executed. On the other hand, if the resistance jump has a numerical value that is too large or too small, it means that, in comparison with initial resistance Ri, there is drastic increase or decrease in resistance after 1000 cycles are executed. In the present test, 16V/50 A or 25V/50 A are repeated by 1000 cycles for the reason to undergo the so-called cycle life test by testing voltage endurance of the device 20. If the device 20 after the cycle life test is finished is not blown, this means the device 20 "PASS" the test. If the device 20 is blown during the cycle life test, this means that the device 20 "FAIL" in the test.

TABLE 2

|    | Ri (Ω) | R1000@ 16 V/50 A (Ω) | (R1000@ 16 V/50 A)/ (Ri) | R1000@ 25 V/50 A (Ω) | (R1000@ 25 V/50 A)/ (Ri) |
|----|--------|----------------------|--------------------------|----------------------|--------------------------|
| E1 | 0.034  | 0.032                | 0.92 (PASS)              | 0.032                | 0.92 (PASS)              |
| E2 | 0.021  | 0.023                | 1.10 (PASS)              | 0.025                | 1.23 (PASS)              |
| E3 | 0.042  | 0.034                | 0.82 (PASS)              | 0.040                | 0.96 (PASS)              |
| E4 | 0.031  | 0.029                | 0.93 (PASS)              | 0.031                | 1.00 (PASS)              |
| C1 | 0.078  | 0.051                | 0.65 (PASS)              | 0.052                | 0.66 (PASS)              |
| C2 | 0.083  | 0.051                | 0.62 (PASS)              | 0.058                | 0.70 (PASS)              |
| C3 | 0.048  | 0.036                | 0.74 (PASS)              | 0.036                | 0.74 (PASS)              |
| C4 | 0.062  | 0.038                | 0.61 (PASS)              | 0.045                | 0.72 (PASS)              |

As mentioned above, the top-view area and the thickness of the PTC material layer in E1-E4 are reduced. However, Table 2 reveals that, by using appropriate volume percentage of carbon black (C.B.) and fluoropolymer, E1-E4 has a resistance jump $R_{jump\_1000@16V/50A}$ falling within the range of 0.82-1.10, and a resistance jump $R_{jump\_1000@25V/50A}$ falling within the range of 0.92-1.23. C1-C2 has a PTC material layer having the same top-view area as that in E1-E4, but having a thicker thickness in comparison with E1-E4, C1-C2 has a resistance jump $R_{jump\_1000@16V/50A}$ falling within the range of 0.62-0.65, and a resistance jump $R_{jump\_1000@25V/50A}$ falling within the range of 0.66-0.70. That is, resistance variation in C1-C2 after the cycle life test is finished is larger than that in E1-E4. This is caused by the reason that E1-E4 has fewer amount of C.B. volume percentage in the PTC material layer than that for C1-C2, and for this reason, E1-E4 has an excellent resistance jump and thus has a superior resistance recovery. The PTC material used in C3-C4 is of a traditional size design, which has a width, length and thickness much greater than those in E1-E4, and includes an amount of C.B. comprising 35% by volume of the PTC material layer. The test result shows that C3-C4 has a resistance jump $R_{jump\_1000@16V/50A}$ falling within the range of 0.61-0.74, and a resistance jump $R_{jump\_1000@25V/50A}$ falling within the range of 0.72-0.74. Likewise, resistance variation in C3-C4 after the cycle life test is finished is larger than that in E1-E4.

Despite reduced size of over-current protection devices in E1-E4, the test result shows that the over-current protection devices in E1-E4 can still "PASS" the cycle life test at 16V/50 A and 25V/50 A, indicating that the over-current protection devices are not blown. All C1-C4 have a PTC material layer with a thickness larger than that in E1-E4, therefore it is predictable that the over-current protection devices in C1-C4 have good voltage endurance, and there is no blowout phenomena occurring for any devices during the voltage endurance test.

Other than the above, five over-current protection devices for each of E1-E4 and C1-C4 are taken as samples to perform the following measurements: (1) trip current (I-trip) at 25° C.; and (2) leakage current as 16V/50 A is applied to the device to activate trip of device at 25° C. The trip current per unit area of the device (A/mm²) and endurable power per unit area of the device (W/mm²) can be calculated upon trip current value, the area of the device, and the operating voltage. The trip current per unit area of the device (A/mm²) is used to evaluate endurable current per unit area of the device (A/mm²). When 16V/50 A is applied to the device at 25° C., the over-current protection device will trip. However, because the current cannot be cut-off completely, there is leakage current in the device. Based on the leakage current and the applied voltage value 16V at which the device is not blown, the power dissipation (W) can be calculated as 16V/50 A is applied to the device at 25° C. Table 3 shows the test results for E1-E4 and C1-C4.

TABLE 3

|    | I-trip (A) | I-trip/area (A/mm²) | Endurable power/area (W/mm²) | Leakage current (A) | Power dissipation (W) |
|----|-----------|---------------------|-------------------------------|---------------------|------------------------|
| E1 | 5.36      | 0.075               | 1.881                         | 0.112               | 1.79                   |
| E2 | 6.88      | 0.097               | 2.414                         | 0.136               | 2.18                   |
| E3 | 4.92      | 0.069               | 1.726                         | 0.122               | 1.95                   |
| E4 | 5.92      | 0.083               | 2.077                         | 0.139               | 2.22                   |
| C1 | 4.43      | 0.062               | 1.554                         | 0.152               | 2.43                   |
| C2 | 4.25      | 0.060               | 1.491                         | 0.151               | 2.42                   |
| C3 | 5.53      | 0.058               | 1.440                         | 0.177               | 2.83                   |
| C4 | 5.36      | 0.056               | 1.396                         | 0.169               | 2.70                   |

The top-view area of the PTC material layer in E1-E4 is reduced, and the thickness thereof is reduced as well. However, Table 3 reveals that, by using appropriate volume percentage of carbon black (C.B.) and fluoropolymer, the over-current protection device in E1-E4 has a trip current per unit area of the device (i.e., endurable current per unit area of the device) from 0.069 A/mm² to 0.097 A/mm². The over-current protection device in C1-C4 has an endurable current per unit area of the device from 0.056 A/mm² to 0.062 A/mm². Apparently, compared to the over-current protection device in C1-C4, the over-current protection device in E1-E4 has quite excellent endurable current per unit area of the device. The endurable power per unit area of the device in E1-E4 is also higher than that in C1-C4, wherein the endurable power per unit area of the device in E1-E4 between 1.726 W/mm$^2$ and 2.414 W/mm$^2$.

When 16V/50 A is applied to the device at 25° C., the over-current protection device will trip, as said above. Thus, the power dissipation (W) can be calculated by measuring leakage current of the device. Table 3 shows that E1-E4 has a leakage current of 0.112-0.139 A, which is smaller than the leakage current of 0.151-0.177 A in C1-C4. Also and certainly, E1-E4 will have a power dissipation less than that in C1-C4, wherein E1-E4 has a power dissipation of 1.79-2.22 W, and C1-C4 has a power dissipation of 2.42-2.83 W.

The above tests for Embodiments E1-E4 are performed on the basis that the PTC material layer has a top-view area of 71.2 mm$^2$ and a thickness of 0.14-0.20 mm. In practice, the inventors of the present invention found that the PTC material layer may have a top-view area of 50-75 mm$^2$ (e.g., 55 mm$^2$, 60 mm$^2$ or 70 mm$^2$) and a thickness of 0.12-0.20 mm (e.g., 0.14 mm, 0.16 mm or 0.18 mm). All these sizes can make the miniaturized over-current protection device have features of excellent voltage endurance, superior resistance jump, high endurable current per unit area of the device, high endurable power per unit area of the device, and low power dissipation.

In summary, the present invention provides an over-current protection device which may be in form of a radial-leaded type, an axial-type, or a surface-mountable type. The polymer matrix used in the PTC material layer of the over-current protection device includes at least one fluoropolymer comprising 55-65% (e.g., 57%, 60% or 63%) by volume of the PTC material layer. The conductive filler could be carbon black (C.B.), for example, and comprises 30-34% (e.g., 31%, 32% or 33%) by volume of the PTC material layer. Preferably, the PTC material layer may further include magnesium hydroxide ($Mg(OH)_2$), which serves as a flame retardant and comprises 2-10% (e.g., 4%, 6% or 8%) by volume of the PTC material layer. By using appropriate volume percentage of carbon black (C.B.) and fluoropolymer, the miniaturized over-current protection device provided by the present invention can pass the cycle life test at 16V/50 A and 25V/50 A by 1000 cycles without blowout. The over-current protection device has a resistance jump at 16V/50 A by 1000 cycles, i.e., $R_{jump\_1000@16V/50A}$, falling within a range of 0.80-1.20, such as 0.90, 1.00 or 1.10. The over-current protection device has a resistance jump at 25V/50 A by 1000 cycles, i.e., $R_{jump\_1000@25V/50A}$, falling within a range of 0.90-1.30, such as 1.00, 1.10 or 1.20. The over-current protection device also exhibits the features of high endurable current per unit area of the device, high endurable power per unit area of the device, and low power dissipation. With the endurable voltage being increased to 25V, the endurable current per unit area of the device increases to 0.070-0.100 A/mm$^2$ (e.g., 0.080 A/mm$^2$ or 0.090 A/mm$^2$), and the endurable power per unit area of the device increases to 1.70-2.5 W/mm$^2$ (e.g., 1.90 W/mm$^2$, 2.10 W/mm$^2$, or 2.30 W/mm$^2$). Moreover, the over-current protection device has a power dissipation of 1.70-2.30 W (e.g., 1.90 W or 2.10 W) when 16V/50 A is applied to the device at 25° C.

The over-current protection device of the present invention is used for high-temperature environment applications. Therefore, it is required that the fluoropolymer should have a melting point temperature higher than 150° C., and the fluoropolymer is not limited to PVDF and PTFE. Alternatively, other fluoropolymers having melting point temperatures higher than 150° C. and similar features can be used also, such as polyvinylidene fluoride, ethylene-tetrafluoro-ethylene copolymer, tetrafluoroethylene-hexafluoro-propyl-ene copolymer (FEP), ethylene-tetrafluoroethylene copolymer (PETFE), perfluoroalkoxy modified tetrafluoroethylenes (PFA), poly(chlorotri-fluorotetrafluoro-ethylene) (PCTFE), vinylidene fluoride-tetrafluoroethylene copolymer (VF-2-TFE), poly(vinylidene fluoride), tetrafluoroethylene-perfluorodioxole copolymer, vinylidene fluoride-hexafluoropropylene copolymer, and vinylidene fluoride-hexafluoropropylene-tetrafluoroethylene terpolymer. Preferably, a plurality of fluoropolymers with different melting point temperatures could be used by which a smooth resistance-to-temperature curve (R-T curve) is obtained to enhance the stability of cycle life test and voltage endurance.

The flame retardant can be halogen or phosphorous containing retardant, metal hydroxide (e.g., $Al_2(OH)_3$ or $Mg(OH)_2$), metal oxide (e.g., ZnO or $Sb_2O_3$), nitride (e.g., BN), or any mixtures thereof.

The over-current protection device of the present invention has a small size, but still has excellent voltage endurance and does not have a resistance jump that is too large or too small. The over-current protection device also exhibits the features of high endurable current per unit area of the device, high endurable power per unit area of the device, and low power dissipation. The over-current protection device of the present invention is quite suitable for high temperature over-current protection applications.

The above-described embodiments of the present invention are intended to be illustrative only. Numerous alternative embodiments may be devised by persons skilled in the art without departing from the scope of the following claims.

What is claimed is:

1. An over-current protection device, comprising:
   a first electrode layer;
   a second electrode layer; and
   a PTC material layer laminated between the first and second electrode layers, the PTC material layer comprising:
   a polymer matrix comprising at least one fluoropolymer with a melting point temperature higher than 150° C., and comprising 55-65% by volume of the PTC material layer; and
   carbon black dispersed in the polymer matrix, and comprising 30-34% by volume of the PTC material layer;
   wherein a resistance jump $R_{jump\_1000@16V/50A}$ of the over-current protection device at 16V/50 A by 1000 cycles is 0.80-1.20; and
   wherein a resistance jump $R_{jump\_1000@25V/50A}$ of the over-current protection device at 25V/50 A by 1000 cycles is 0.90-1.30.

2. The over-current protection device of claim 1, wherein the fluoropolymer comprises at least one of poly(vinylidene fluoride), polytetrafluoroethene, polyvinylidene fluoride, ethylene-tetra-fluoro-ethylene copolymer, tetrafluoroethylene-hexafluoro-propylene copolymer, ethylene-tetrafluoroethylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer.

3. The over-current protection device of claim 1, wherein the PTC material layer further comprises a flame retardant selected from the group consisting of halogen or phosphorous containing retardant, metal hydroxide, metal oxide, nitride, and any mixtures thereof, and comprising 2-10% by volume of the PTC material layer.

4. The over-current protection device of claim 1, wherein the PTC material layer has a thickness of 0.12-0.20 mm.

5. The over-current protection device of claim 1, wherein the PTC material layer has a top-view area of 50-75 mm².

6. The over-current protection device of claim 1, wherein the over-current protection device passes a cycle life test at 16V/50 A and 25V/50 A by 1000 cycles without blowout.

7. The over-current protection device of claim 1, wherein an endurable current per unit area of the over-current protection device is 0.070-0.100 A/mm².

8. The over-current protection device of claim 1, wherein an endurable power per unit area of the over-current protection device is 1.70-2.5 W/mm².

9. The over-current protection device of claim 1, wherein the over-current protection device has a power dissipation of 1.70-2.30 W when 16V/50 A is applied to the over-current protection device at 25° C.

* * * * *